United States Patent
Sharma et al.

(10) Patent No.: US 10,769,408 B2
(45) Date of Patent: Sep. 8, 2020

(54) METHOD AND SYSTEM FOR AUTOMATIC CHROMOSOME CLASSIFICATION

(71) Applicant: Tata Consultancy Services Limited, Mumbai (IN)

(72) Inventors: Monika Sharma, Gurgaon (IN); Swati Jindal, Gurgaon (IN); Lovekesh Vig, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 62 days.

(21) Appl. No.: 16/246,278

(22) Filed: Jan. 11, 2019

(65) Prior Publication Data
US 2020/0012838 A1    Jan. 9, 2020

(30) Foreign Application Priority Data

Jul. 6, 2018    (IN) .............................. 201821025353

(51) Int. Cl.
*G06K 9/00* (2006.01)
*G06T 7/73* (2017.01)

(52) U.S. Cl.
CPC ....... *G06K 9/0014* (2013.01); *G06K 9/00147* (2013.01); *G06T 7/74* (2017.01);
(Continued)

(58) Field of Classification Search
CPC .............. G06K 9/0014; G06K 9/6273; G06K 9/00147; G06T 2207/10004;
(Continued)

(56) References Cited

U.S. PATENT DOCUMENTS

| 7,383,237 B2 | 6/2008 | Zhang et al. |
| 9,336,430 B2 | 5/2016 | Zhang et al. |

OTHER PUBLICATIONS

Ming, Delie, and Jinwen Tian. "Automatic pattern extraction and classification for chromosome images." Journal of Infrared, Millimeter, and Terahertz Waves 31, No. 7 (2010): 866-877. (Year: 2010).*

(Continued)

*Primary Examiner* — Carol Wang
(74) *Attorney, Agent, or Firm* — Finnegan, Henderson, Farabow, Garrett & Dunner LLP

(57) ABSTRACT

Method and system for automatic chromosome classification is disclosed. The system, alternatively referred as a Residual Convolutional Recurrent Attention Neural Network (Res-CRANN), utilizes property of band sequence of chromosome bands for chromosome classification. The Res-CRANN is end-to-end trainable system, in which a sequence of feature vectors are extracted from the feature maps produced by convolutional layers of a Residual neural networks (ResNet), wherein the feature vectors correspond to visual features representing chromosome bands in an chromosome image. The sequence feature vectors are fed into Recurrent Neural Networks (RNN) augmented with an attention mechanism. The RNN learns the sequence of feature vectors and the attention module concentrates on a plurality of Regions-of-interest (ROIs) of the sequence of feature vectors, wherein the ROIs are specific to a class label of chromosomes. The Res-CRANN provides higher classification accuracy as compared to the state-of the-art methods for chromosome classification.

15 Claims, 4 Drawing Sheets

(52) U.S. Cl.
CPC ............... *G06T 2207/10004* (2013.01); *G06T 2207/20081* (2013.01)

(58) Field of Classification Search
CPC ............ G06T 2207/20081; G06T 7/74; G06N 3/0445; G06N 3/0454; G06N 3/08
See application file for complete search history.

(56) References Cited

OTHER PUBLICATIONS

Moradi, Mehdi, and S. Kamaledin Setarehdan. "New features for automatic classification of human chromosomes: A feasibility study." Pattern recognition letters 27, No. 1 (2006): 19-28. (Year: 2006).*

Sampat, Mehul P., Alan C. Bovik, Jake K. Aggarwal, and Kenneth R. Castleman. "Supervised parametric and non-parametric classification of chromosome images." Pattern Recognition 38, No. 8 (2005): 1209-1223. (Year: 2005).*

Errington, P.A. et al. (1993). "Application of Artificial Neural Networks to Chromosome Classification," *Cytometry*, vol. 14; pp. 627-639.

Wang, X. et al. (Feb. 2009). "Automated Classification of Metaphase Chromosomes: Optimization of an Adaptive Computerized Scheme," *J Biomed Inform.*, vol. 42, No. 1; pp. 22-31.

\* cited by examiner

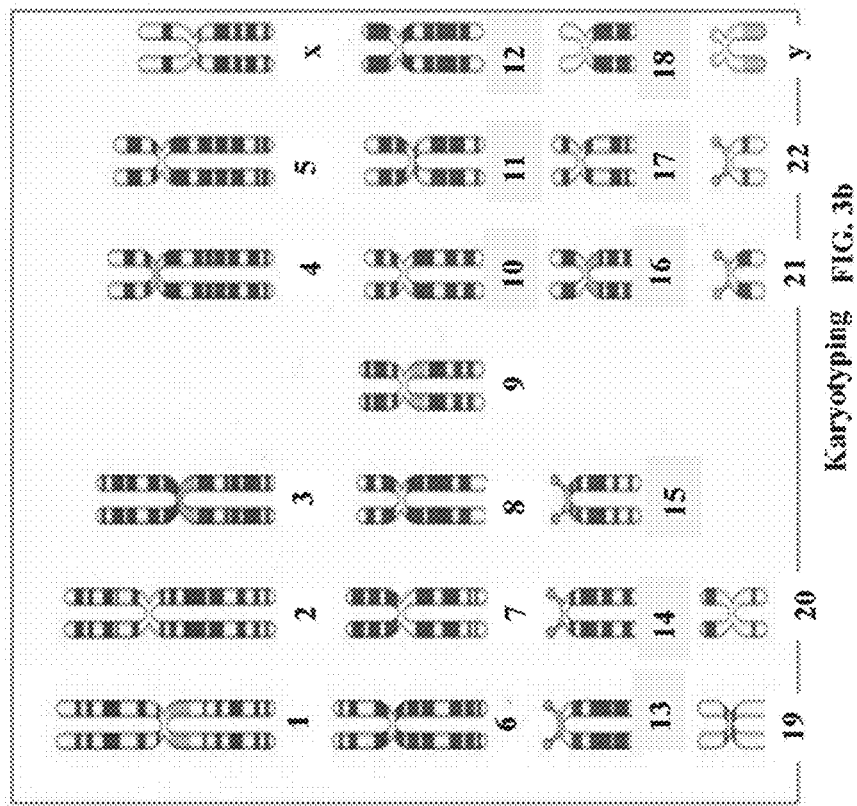
Karyotyping FIG. 3b
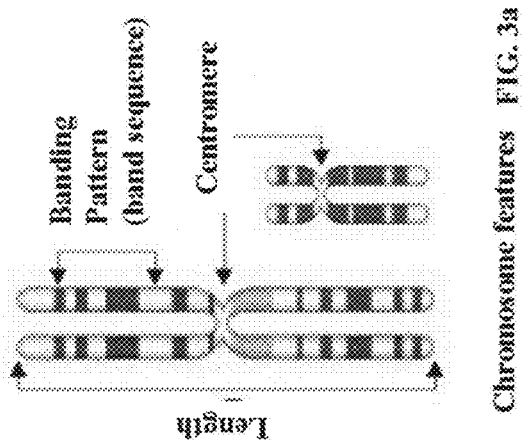
Chromosome features FIG. 3a

METHOD AND SYSTEM FOR AUTOMATIC CHROMOSOME CLASSIFICATION

CROSS-REFERENCE TO RELATED APPLICATIONS AND PRIORITY

This application takes priority from the Indian filed application no. 201821025353 filed on 6 Jul. 2018 the entirety of which is hereby incorporated by reference.

DESCRIPTION

Technical Field

The disclosure herein generally relates to classification problems, and, more particularly, to systems and methods for automatic chromosome classification.

Background

Chromosome Karyotyping refers to the task of segmenting and classifying individual chromosome images obtained from stained cell images micro photographed during the metaphase stage of cell division. The karyotyped images are useful for diagnosis of genetic disorders such as Down syndrome, Turner syndrome and certain types of cancers. Conventionally, a significant amount of manual effort and time is spent on segmenting and classifying the individual chromosome images. Considerable development is carried out in automatic chromosome classification.

However, existing automatic chromosome classification method utilize length, centromere and banding profile as features of chromosomes for classifying the chromosomes. Recently, deep learning models have been applied to automate this task. In chromosome classification, accuracy is critical while trying to achieve time efficiency.

SUMMARY

Embodiments of the present disclosure present technological improvements as solutions to one or more of the above-mentioned technical problems recognized by the inventors in conventional systems.

In an aspect, there is provided a processor implemented method for automatic chromosome classification. The method comprises receiving a chromosome image comprising a chromosome with a plurality of chromosome bands; extracting visual features associated with the chromosome bands of the chromosome by generating a plurality of feature maps with dimension G×H×K; obtaining a plurality of feature vectors from the plurality of feature maps, with each feature vector $F_g$ of dimension H*K, by applying horizontal slicing on the plurality of feature maps; concatenating the plurality of feature vectors in from a top chromosome band to a bottom chromosome band among the plurality of chromosome bands to generate a feature sequence (Si=G×H*K); and classifying the chromosome into a class label among a plurality of pre-determined class labels of chromosomes by processing the feature sequence using a Recurrent Neural Network (RNN) augmented with an attention mechanism, wherein the RNN learns the feature sequence and the attention mechanism concentrates on a plurality of Regions-of-interest (ROIs) of the feature sequence, wherein the ROIs are specific to a class label of chromosomes. Classifying the chromosomes further comprises utilizing a softmax layer, which assigns unique class label to the feature sequence.

In another aspect, there is provided a system comprising: one or more data storage devices operatively coupled to the one or more processors and configured to store instructions configured for execution by the one or more processors to receive a chromosome image comprising a chromosome with a plurality of chromosome bands; extract visual features associated with the chromosome bands of the chromosome by generating a plurality of feature maps with dimension G×H×K; obtain a plurality of feature vectors from the plurality of feature maps, with each feature vector $F_g$ of dimension H*K, by applying horizontal slicing on the plurality of feature maps; concatenate the plurality of feature vectors from a top chromosome band to a bottom chromosome band among the plurality of chromosome bands to generate a feature sequence (Si=G×H*K); and classify the chromosome into a class label among a plurality of pre-determined class labels of chromosomes by processing the feature sequence using a Recurrent Neural Network (RNN) augmented with an attention mechanism, wherein the RNN learns the feature sequence and the attention mechanism concentrates on a plurality of Regions-of-interest (ROIs) of the feature sequence, wherein the ROIs are specific to a class label of chromosomes. Further, classifying the chromosomes further comprises utilizing a softmax layer which assigns unique class label to the feature sequence.

In yet another aspect, there is provided a computer program product comprising a non-transitory computer readable medium having a computer readable program embodied therein, wherein the computer readable program, when executed on a computing device, causes the computing device to perform actions comprising: receiving a chromosome image comprising a chromosome with a plurality of chromosome bands; extracting visual features associated with the chromosome bands of the chromosome by generating a plurality of feature maps with dimension G×H×K; obtaining a plurality of feature vectors from the plurality of feature maps, with each feature vector $F_g$ of dimension H*K, by applying horizontal slicing on the plurality of feature maps; concatenating the plurality of feature vectors in from a top chromosome band to a bottom chromosome band among the plurality of chromosome bands to generate a feature sequence (Si=G×H*K); and classifying the chromosome into a class label among a plurality of pre-determined class labels of chromosomes by processing the feature sequence using a Recurrent Neural Network (RNN) augmented with an attention mechanism, wherein the RNN learns the feature sequence and the attention mechanism concentrates on a plurality of Regions-of-interest (ROIs) of the feature sequence, wherein the ROIs are specific to a class label of chromosomes. Classifying the chromosomes further comprises utilizing a softmax layer, which assigns unique class label to the feature sequence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 3(a) and 3(b) illustrates karyotyped chromosomes based on features of chromosomes, in accordance with an embodiment of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and system for automatic chromosome classification. The system, alternatively referred as a Residual Convolutional Recurrent Attention Neural Network (Res-CRANN), utilizes property of band sequence of chromosome images for chromosome classification. The Res-CRANN is end-to-end trainable system, in which a sequence of feature vectors, alternatively referred as feature sequence, are extracted from the feature maps produced by convolutional layers of a Residual neural networks (ResNet), wherein the feature vectors correspond to visual features representing chromosome bands in a chromosome image. The sequence of feature vectors are fed into Recurrent Neural Networks (RNN) augmented with an attention mechanism. The RNN learns the sequence of feature vectors and the attention module concentrates on a plurality of Regions-of-interest (ROIs) of the sequence of feature vectors, wherein the ROIs are specific to a class label of chromosomes. The Res-CRANN provides higher classification accuracy as compared to the state-of the-art methods for chromosome classification.

Figure 1:
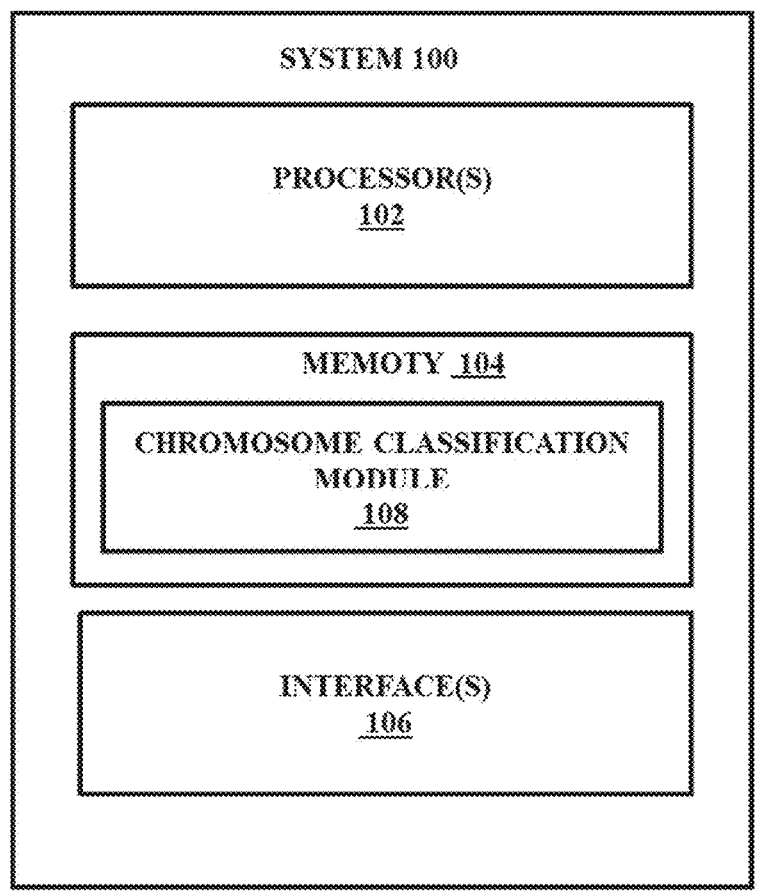
FIG. 1 illustrates a system for automatic chromosome classification, in accordance with an embodiment of the present disclosure.
Figure 2:
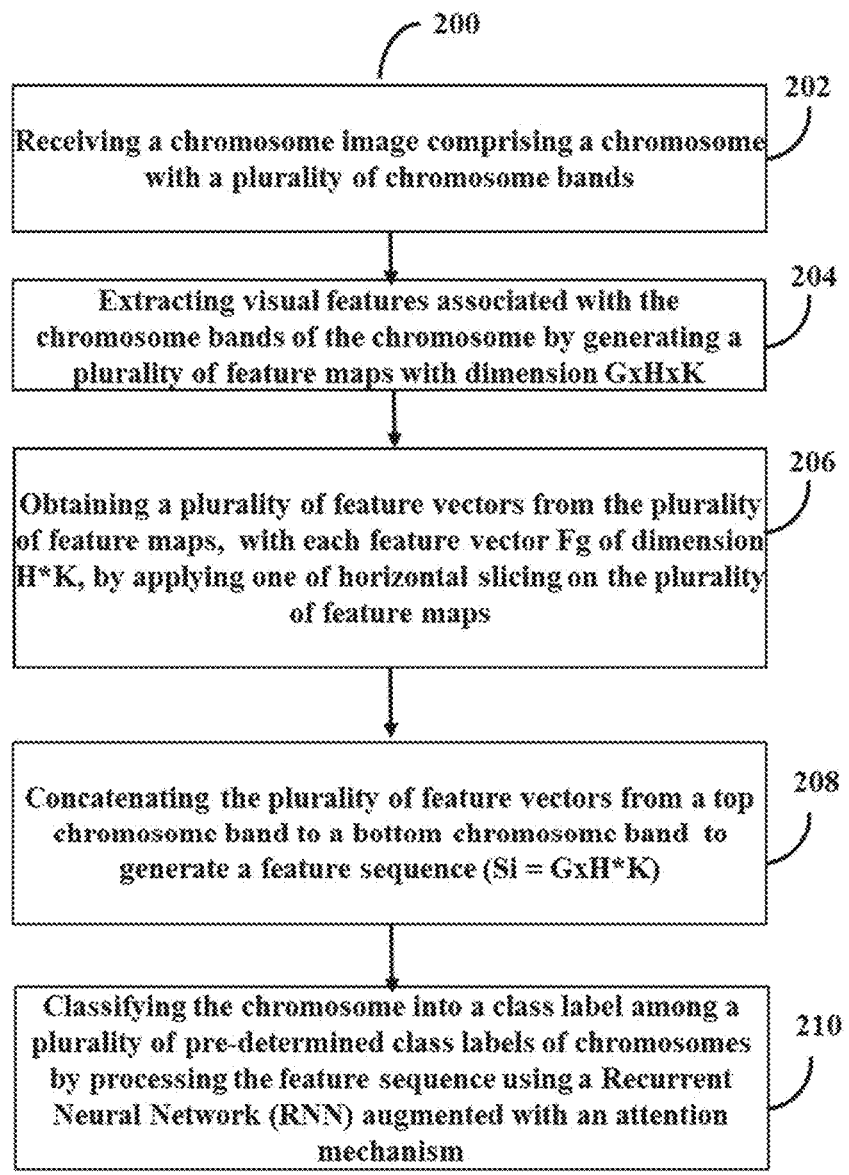
FIG. 2 illustrate exemplary flow diagrams for a computer implemented method automatic chromosome classification, in accordance with an embodiment of the present disclosure.

Referring now to the drawings, and more particularly to FIG. 1 through FIG. 3 where similar reference characters denote corresponding features consistently throughout the figures, there are shown preferred embodiments and these embodiments are described in the context of the following exemplary system and/or method.

FIG. 1 illustrates a system for automatic chromosome classification, in accordance with an embodiment of the present disclosure. In an embodiment, the system 100 includes one or more processors 102, communication interface device(s) or input/output (I/O) interface(s) 106, and one or more data storage devices or memory 104 operatively coupled to the one or more processors 1024. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (such as chromosome classification module 108) of the system 100 can be stored in the memory 102.

FIG. 2 illustrate exemplary flow diagrams for a computer implemented method for automatic chromosome classification, in accordance with an embodiment of the present disclosure. In an embodiment, the system 100 includes one or more data storage devices or memory 104 operatively coupled to the one or more processors 102 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The chromosomes have characteristic and unique sequence of light and dark colored bands (banding pattern), as shown in FIG. 3(a), which help to distinguish between different chromosome classes or class labels, such as chromosome 1 through 22, x and y. The karyotyped chromosome class labels are depicted in FIG. 3(b). The position and size of bands, interchangeably referred as chromosome bands, are highly chromosome-specific. The bands or banding pattern or band sequence provides a useful way of subdividing various regions of chromosomes and each band is assigned a specific number that a user, such as a doctor, utilizes for assigning label to a particular chromosome. However, conventional Deep CNNs (DCNNs) are not able to exploit this characteristic as they mostly concentrate on learning image features and thus, cannot be directly applied to learn sequence prediction. The method 200 provides an architecture to learn sequence of appearance of these bands explicitly by employing Recurrent Neural Networks (RNN), which can process sequential data of varied length, such as text or speech. The system (Res-CRANN) disclosed incorporates the band sequence property by reading the chromosome images horizontally from top-to-bottom (a top chromosome band to a bottom chromosome band among the plurality of chromosome bands). Also, the existing methods does not give very high accuracy of chromosome classification. Medical images when analyzed, the analysis needs to be highly accurate when used for diagnosis. Right diagnosis is crucial in treating a patient, specifically in serious illness such as cancer or gene disorders and the like, where chromosome karyotyping plays a major role. Thus, achieving higher accuracy of the proposed method and system 100 supersedes current state-of-the-art in automatic chromosome classification. Further, considering the typical example of chromosome images, where the captured chromosomes are of very low size (few micrometers), accurate visual feature extraction from the chromosome images is a challenge. The method disclosed is able to extract the visual features of the chromosome to accurately classify the chromosomes based on the visual features . . . .

In an embodiment, the method 200 utilizes Long-Short Term Memory Networks (LSTM), which a special type of RNN used for modeling long-term dependencies in the data using a gating mechanism. The method 200 discloses a combination of DCNN and LSTM for recognizing the band sequence in the chromosome image in a similar fashion as Convolutional Recurrent Neural Networks (CRNN) have been applied for text recognition. There exists numerous literature on text recognition, however reading band sequence of chromosomes for classification purpose, which involves representing the chromosome image in mathematical form by convolutional operations and subsequently, converting this mathematical representation into sequence of feature vectors to be fed into LSTM has not been explored. The process of learning sequence of light and dark bands in chromosomes is analogous to reading characters one-by-one in image based text sequence recognition task. Thus, the method 200 enables to extract sequence of feature vectors by horizontal or row wise concatenation of feature maps produced by convolutional layers of ResNet and feed this sequence to LSTM. Further, the LSTM is augmented with the attention mechanism that enables the RNN to pay attention to the relevant regions of Interest (ROIs) of the input chromosome image or sequence. The attention mechanism is added after LSTM because there is a particular region/subsequence in the chromosome band sequence which represents a particular chromosome class. Thus, the attention mechanism comprising a neural network based attention module enables the RNN network learn to pay attention to that specific region-of-interest (ROI), effectively improving the classification accuracy.

The system 100 comprises the chromosome classification module 108, which is a deep attention based CRNN model with bottom DCNN replaced by 50-layer ResNet model followed by LSTM whose output sequence is passed through attention mechanism. This system 100 network architecture is referred as or the Residual Convolutional Recurrent Attention Neural Networks (Res-CRANN). Each component or block of the chromosome classification module 108 based on the Res-CRANN architecture and its functionality is described below.

Residual neural networks (ResNets): The Res-Nets are very intriguing and proven to be very robust in various visual and non-visual tasks. The Res-Nets utilize the deep residual learning framework which makes the training of deeper neural networks easier. This residual framework replaces the blocks of convolutional layers by shortcut connections to form shortcut blocks, also known as residual blocks. The residual block, can be expressed as in equation 1 below:

$$y = F(x, \{W_i\}) + x \quad (1)$$

Where, x and y are input and output of the residual block and function $F(x, \{W_i\})$ represents the residual mapping to be learned. The residual blocks try to model an optimal function which is closer to an identity mapping than to a zero mapping, and that it should be easier to find the perturbations with reference to an identity mapping than to a zero mapping. This simplifies the optimization of ResNets at almost no cost. Subsequent residual blocks in ResNets are thus responsible for fine-tuning the output of previous block, instead of generating the desired output from scratch. Main property of these residual connections is that they neither introduce extra parameters nor increase computational complexity. The residual blocks are stacked and residual mapping helps in handling the vanishing gradient problem in the deeper networks which makes optimization easy and thus, results in improvement of training efficiency. ResNets have multiple versions of architectures, represented as m-layer ResNet model, where m is the number of layers in the corresponding architecture and can take values in f50, 101, 152 g.

Convolutional Recurrent Neural Networks (CRNN): The CRNN is a combination of Deep Convolutional Neural Networks (DCNN) and Recurrent Neural Network (RNN), whose architecture is mainly designed to recognize sequence-like objects in the image, herein band sequence in chromosomes. The traditional architecture of CRNN involves convolutional layers, recurrent layers and transcription layers from bottom to top. However, the method 200, implemented with system 100 replaces the transcription layers by a softmax layer for the task of classification. The transcription layer assigns labels to every character in text sequence whereas, the system 100 utilizes softmax layer which assigns one class label to entire band sequence for chromosome classification. The convolutional layers, of underlying DCNN in CRNN architecture take the image, alternatively referred as chromosome image as an input and produces corresponding feature maps. These feature maps are then used to extract sequence of feature vectors where each feature vector is generated by concatenating rows of filter maps from top to bottom. Subsequently, this sequence of feature vectors (feature sequence) is fed to recurrent neural network, in an embodiment long short term memory networks (LSTM), which produces labels for each frame of the feature sequence. A softmax layer at the top translates the per-frame predictions by LSTM into a class-label sequence. The entire system 100, comprising the chromosome classification module, is trained end-to-end by using a single loss function which jointly trains both constituent networks (i.e., DCNN and LSTM).

Attention based Sequence Learning: The attention mechanism in the neural networks is based on the visual attention mechanism found in humans. When a human sees an image, his visual attention boils down to focus on a certain region-of-interest in an image with high resolution while perceiving the surrounding area of the image with low resolution, and then he keeps adjusting his focus over time. This attention mechanism, typically in case of long sequences, utilizes the attention to make the network learn to concentrate on particular Region-of-interest (ROI) of these sequences. The attention mechanism in neural networks reduces the number of parameters required to train the network and also avoids the chances of overfitting.

In an embodiment of the present disclosure, at step 202, the one or more processors 102 in conjunction with the chromosome classification module 108 are configured to receive a chromosome image comprising a chromosome with a plurality of chromosome bands. Chromosome karyotyping is a two-stage process: first is the segmentation of cell spread image during metaphase stage of cell division and second is the classification of individual chromosomal segments or individual chromosomes. Herein, it is assumed that the system 100 receives segmented and straightened individual chromosomes (normalized chromosomes) that have to be classified to the right class label for karyotyping. The normalization can be performed by methods known-in the art.

The complete network is trained end-to-end and the fully connected softmax layer at the output automatically gives the class-label for a chromosome image being analyzed. At step, 204, the one or more processors 102 in conjunction with the chromosome classification module 108 are configured to extract visual features associated with the chromosome bands of the chromosome by generating a plurality of feature maps (G×H×K) for the chromosome. In an embodiment, the bottom of Res-CRANN is a 50-layer ResNet model which produces feature maps as a result of convolutional layers. For extracting visual convolutional feature maps, any deep convolutional network like CNN, ResNet, inception, xception can be used including variants of ResNet such as ResNet-50, ResNet-101, ResNet-152 and the like. At step 206, the one or more processors 102 in conjunction with the chromosome classification module 108 are configured to obtain a plurality of feature vectors (H*K) from the plurality of feature maps by using one of horizontal and vertical slicing on the plurality of feature maps. At step 208, the one or more processors 102 in conjunction with the chromosome classification module 108 are configured to concatenate the plurality of feature vectors from top to bottom to generate a feature sequence (G×H*K) or sequence of feature vectors. These feature maps are then converted into a feature sequence in a similar fashion to CRNN by concatenation of the horizontal vectors of each feature map whose mathematical interpretation is explained below:

$$F_g^i = \text{concat}(f_{gk}^i); k=1 \text{ to } K \quad (2)$$

Where, Fg is a feature vector of dimension H*K obtained from ResNet convolutional feature maps, $f_{gk}$ is $g^{th}$ horizontal vector of kth filter map, i represents the $i^{th}$ image and K is the total number of filter maps. The final feature sequence Si of the $i^{th}$ image is given by:

$$S^i = [F_1^i, F_2^i, \ldots, F_G^i]^{G \times H \times K} \quad (3)$$

Where, G and H are the height and width of the feature map obtained from the topmost convolutional layer of ResNet-50 model.

At step 210, the one or more processors 102 in conjunction with the chromosome classification module 108 are configured to process the feature sequence of feature vectors using a Recurrent Neural Network (RNN) augmented with an attention mechanism to classify the chromosome into a class label among a plurality of pre-determined class labels of chromosomes, wherein the RNN learns the feature sequence and the attention mechanism concentrates on a plurality of Regions-of-interest (ROIs) of the sequence of feature vectors, wherein the ROIs are specific to a class label of chromosomes. In an embodiment, the feature sequence Si is then passed through LSTM (a type of RNN) which learns to predict the band sequence. Subsequently, the LSTM output is fed into an attention block which learns the attention weights for each of the feature vector in the sequence as described below:

Let M be the matrix given by M=[$m_1, m_2, \ldots m_N$], where mi represents the output vector sequence that the LSTM produces and N is the length of sequence. The output representation R of attention block is the weighted sum of these vectors, which is defined as:

$$L = \tan h(M) \quad (4)$$

$$\alpha = \text{softmax}(w^T L) \quad (5)$$

$$R = M\alpha^T \quad (6)$$

Where, w are the weights to be learned for attention block. The final representation r used for classification is given as follows:

$$r = \tan h(R) \quad (7)$$

The representation r produced from the attention mechanism is then passed through the fully connected layer having softmax activation which classifies the image into its corresponding class-label.

EXPERIMENTAL EVALUATION

Dataset used for experimental evaluation: The evaluated performance of the Res-CRANN is performed on Bioimage Chromosome Classification dataset, which is publicly available online. The dataset consists of total 5256 chromosome images of healthy patients which are manually segmented and classified by an expert cytogenecist in order to create the labeled dataset. Out of these 5256 images, we have utilized 4176 for training, 360 for validation and 720 for testing purpose. For conducting the experiments, the resolution of chromosome images is set to 224×224 in gray-scale. In addition, applied is a pre-processing step of length normalization to every chromosome image in the dataset.

Training Details: The first baseline method used for comparing the performance of the method disclosed consists of traditional Deep CNN (row 1 of Table 1).

TABLE 1

Comparative classification Results

| S. No | Network Architecture | Top1 Accuracy % | Top2 Accuracy % | Top2 Accuracy % |
|---|---|---|---|---|
| 1 | Traditional Depp CNN | 87.50 | 96.25 | 98.33 |
| 2 | ResNet-50 | 87.64 | 95.55 | 98.33 |
| 3 | CRNN | 90.27 | 96.80 | 98.33 |
| 4 | Attention based Sequence model | 90.27 | 96.25 | 97.92 |
| 5 | Res-CRANN (Method disclosed) | 90.42 | 96.66 | 98.19 |

Deep CNN model is trained using Adam optimizer with learning rate of 10□4 and rest of the parameters have default values. The second baseline is created with ResNet-50 model (row 2 of Table 1) which is trained using stochastic gradient descent with learning rate of $10^{-3}$, momentum of $10^{-6}$, decay parameter set as 0:9 and nestrov set to be true. Further, the networks presented in rows 3, 4, 5 of Table 1 are trained using Adam optimizer with learning rate of 10□4, epsilon set to be $10^{-8}$ and remaining parameters set to default values. The CRNN model (row 3 of Table 1) comprises of concatenation of ResNet-50 and LSTM models while attention based sequence model (row 4 of Table 1) consists of augmentation of attention block over ResNet-50 model. The number of epochs for training Deep CNN, ResNet-50, CRNN, attention based model and Res-CRANN were set to be 150, 30, 100, 80 and 80, respectively. Validation results were observed at each epoch and track model parameters corresponding to the lowest validation loss, which were later used for testing. All the networks are implemented using Theano and Keras. Table 1 shows the empirical results obtained using the Res-CRANN architecture and baseline methods. The percentage top-k classification accuracy with k set to 1, 3, and 5 is evaluated. The performance of a traditional Deep CNN model is shown in row 1 of Table 1. It comprises of 6 convolution layers with 16, 16, 32, 64, 128 and 256 as number of filters respectively, followed by 2 fully connected layers of dimensions 1024 and 512. Each convolutional layer uses Rectified Linear Units (ReLU) and is followed by a Max-pool layer of size 2×2. Used is 3×3 kernel sized filters in all the convolutional layers. The fully connected layers have sigmoid as their activation function. The last layer is also a fully connected softmax layer having 24 hidden units for 24 chromosome classes with a softmax activation function. As evident in row 1 and row 2 of Table 1, the improved performance of ResNet-50 model as compared to Deep CNN encourages us to use ResNet-50 in the CRNN architecture. Subsequently, row 3 of Table 1 represents the performance of CRNN model which consists of ResNet-50 model in conjunction with LSTM as discussed above.

This Res-CRANN gives the absolute improvement of 2.63% and 2.77% in Top-1 classification accuracy when compared with ResNet-50 and Deep CNN model, respectively. This improvement demonstrates that using convolutional neural networks alone does not allow the learning of the sequence of chromosome bands completely. Thus, sequence information is explicitly incorporated using recurrent neural networks in CRNN model which improves the chromosome classification accuracy. Next, row 4 of Table 1 shows the results for Attention based Sequence model which is an augmentation of attention block to ResNet-50 model, giving comparable performance to that of CRNN model while outperforming both baseline methods. This improvement is the result of learning the relationship between attentional region localization and classification. In Table 1, row 5 shows the performance of our proposed method i.e., Res-CRANN model which achieves the Top-1 classification accuracy of 90.42%, that outperforms previous state-of-the-art algorithms for chromosome classification. Additionally, top-3 and top-5 classification accuracies of Res-CRANN model are also highest when compared with the rest of the models. This shows that all of the three main layers, i.e., convolutional layers, recurrent layers and attention layers contribute to the improved performance of chromosome classification.

Figure 4:
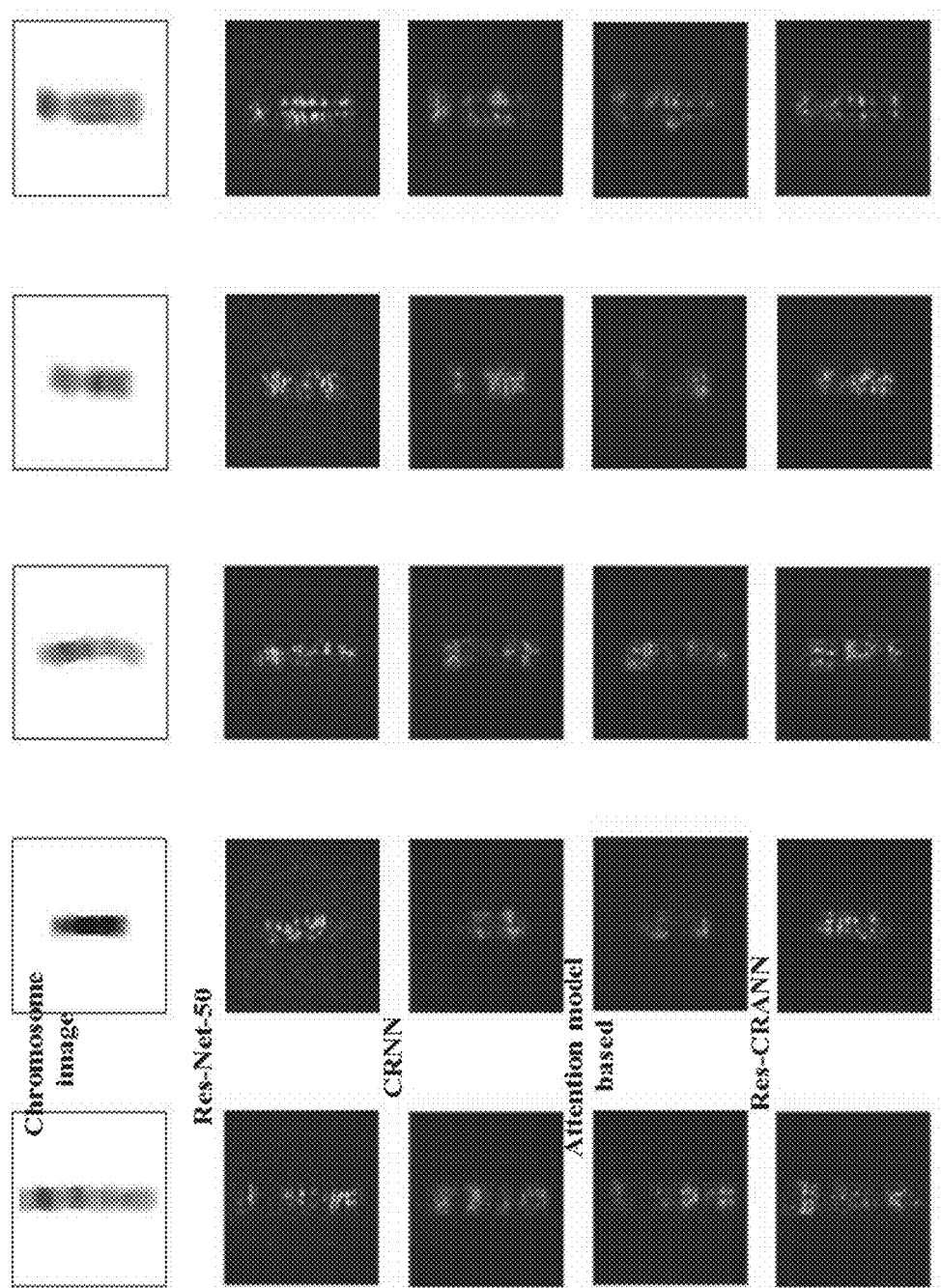
FIG. 4 illustrates comparative analysis of chromosome classification using various approaches, in accordance with an embodiment of the present disclosure.

Further, saliency maps of some chromosomes produced by different network architectures, for example, ResNet-50, CRNN, Attention based CRNN model and Res-CRANN are observed, as shown in FIG. 4. The keras-vis library for generating saliency maps is used. The ResNet-50 produces unwanted noise along with the chromosomal regions and hence, affects the classification accuracy of this network. However, when we augment ResNet-50 with recurrent layers and an attention mechanism (Res-CRANN), the network tries to pay attention only to the chromosome image regions, ignoring the background. This is made evident by the fine saliency maps, shown in FIG. 4, in which only the area of interest, i.e. chromosome and sequence of bands is highlighted. This visualization demonstrates the improved performance of the Res-CRANN architecture over other networks for chromosome classification.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for chromosome classification, the method comprising:
   receiving, via one or more hardware processors, a chromosome image comprising a chromosome with a plurality of chromosome bands;
   extracting, via one or more hardware processors, visual features associated with the plurality of chromosome bands of the chromosome by generating a plurality of feature maps with dimension G×H×K;
   obtaining, via one or more hardware processors, a plurality of feature vectors from the plurality of feature maps, with each feature vector $F_g$ of dimension H*K, by applying horizontal slicing on the plurality of feature maps;
   concatenating, via one or more hardware processors, the plurality of feature vectors in sequence from a top chromosome band to a bottom chromosome band among the plurality of chromosome bands to generate a feature sequence; and
   classifying, via one or more hardware processors, the chromosome into a class label among a plurality of pre-determined class labels of chromosomes by processing the feature sequence using a Recurrent Neural Network (RNN) augmented with an attention mechanism, wherein the RNN learns the feature sequence and the attention mechanism concentrates on a plurality of Regions-of-interest (ROIs) of the feature sequence, wherein the ROIs are specific to a class label of chromosomes.

2. The method as claimed in claim 1, wherein the classifying the chromosome further comprises utilizing a softmax layer, which assigns a unique class label to the feature sequence.

3. The method as claimed in claim 1, wherein the step of generating the plurality of feature maps by extracting the visual features of the chromosome is performed using a Residual Neural Network (ResNet)-50, wherein each feature map is a mathematical representation of the chromosome image.

4. The method as claimed in claim 1, wherein the plurality of chromosome bands of the chromosome image are read from the top chromosome band to the bottom chromosome band as characters are read from left-to-right in a text-sequence.

5. The method as claimed in claim 1, wherein the attention mechanism is an attention module comprising a neural network based learning mechanism, wherein the neural network based learning mechanism focuses on the ROI of the chromosome image with high resolution while perceiving a neighboring area of the chromosome image with low resolution.

6. A system comprising:
   one or more data storage devices operatively coupled to one or more hardware processors and configured to store instructions configured for execution by the one or more hardware processors to:
   receive a chromosome image comprising a chromosome with a plurality of chromosome bands;
   extract visual features associated with the plurality of chromosome bands of the chromosome by generating a plurality of feature maps with dimension G×H×K;
   obtain a plurality of feature vectors from the plurality of feature maps, with each feature vector $F_g$ of dimension H*K, by applying horizontal slicing on the plurality of feature maps;
   concatenate the plurality of feature vectors in sequence from a top chromosome band to a bottom chromosome band among the plurality of chromosome bands to generate a feature sequence; and
   classify the chromosome into a class label among a plurality of pre-determined class labels of chromosomes by processing the feature sequence using a Recurrent Neural Network (RNN) augmented with an attention mechanism, wherein the RNN learns the feature sequence and the attention mechanism concentrates on a plurality of Regions-of-interest (ROIs) of the feature sequence, wherein the ROIs are specific to a class label of chromosomes.

7. The system as claimed in claim 6, wherein the system is further configured to classify the chromosome utilizing a softmax layer, which assigns a unique class label to the feature sequence.

8. The system as claimed in claim 6, wherein the system is configured to generate the plurality of feature maps by extracting the visual features of the chromosome using a Residual Neural Network (ResNet)-50, wherein each feature map is a mathematical representation of the chromosome image.

9. The system as claimed in claim 6, wherein the system is configured to read the plurality of chromosome bands of the chromosome image from the top chromosome band to the bottom chromosome band as characters are read from left-to-right in a text-sequence.

10. The system as claimed in claim 6, wherein the attention mechanism of the system is an attention module comprising a neural network based learning mechanism, wherein the neural network based learning mechanism focuses on the ROI of the chromosome image with high resolution while perceiving a neighboring area of the chromosome image with low resolution.

11. A non-transitory computer readable medium storing instructions which, when executed by a hardware processor, causes the hardware processor to perform actions comprising:
   receiving a chromosome image comprising a chromosome with a plurality of chromosome bands;
   extracting visual features associated with the plurality of chromosome bands of the chromosome by generating a plurality of feature maps with dimension G×H×K;
   obtaining a plurality of feature vectors from the plurality of feature maps, with each feature vector $F_g$ of dimension H*K, by applying horizontal slicing on the plurality of feature maps;
   concatenating the plurality of feature vectors in sequence from a top chromosome band to a bottom chromosome band among the plurality of chromosome bands to generate a feature sequence; and classifying the chromosome into a class label among a plurality of pre-determined class labels of chromosomes by processing the feature sequence using a Recurrent Neural Network (RNN) augmented with an attention mechanism, wherein the RNN learns the feature sequence and the attention mechanism concentrates on a plurality of Regions-of-interest (ROIs) of the feature sequence, wherein the ROIs are specific to a class label of chromosomes.

12. The non-transitory computer readable medium of claim 11, wherein the classifying the chromosome further comprises utilizing a softmax layer, which assigns a unique class label to the feature sequence.

13. The non-transitory computer readable medium of claim 11, wherein the step of generating the plurality of feature maps by extracting the visual features of the chromosome is performed using a Residual Neural Network (ResNet)-50, wherein each feature map is a mathematical representation of the chromosome image.

14. The non-transitory computer readable medium of claim 11, wherein the plurality of chromosome bands of the chromosome image are read from the top chromosome band to the bottom chromosome band as characters are read from left-to-right in a text-sequence.

15. The non-transitory computer readable medium of claim 11, wherein the attention mechanism is an attention module comprising a neural network based learning mechanism, wherein the neural network based learning mechanism focuses on the ROI of the chromosome image with high resolution while perceiving a neighboring area of the chromosome image with low resolution.

\* \* \* \* \*